United States Patent [19]

Zola

[11] 4,169,639

[45] Oct. 2, 1979

[54] KNOCK-DOWN FURNITURE MODULE

[76] Inventor: Colman Zola, 58 Tamarack Way, Pleasantville, N.Y. 10570

[21] Appl. No.: 938,837

[22] Filed: Sep. 1, 1978

[51] Int. Cl.$^2$ ............................................. A47B 47/04
[52] U.S. Cl. .................... 312/265; 108/111; 211/189; 217/12 R; 297/440; 312/111
[58] Field of Search ............... 312/107, 108, 111, 265, 312/264, 263, 257 R, 140; 217/12 R, 16, 43 R; 108/111; 297/440; 211/182, 189, 203; 220/4 F

[56] References Cited

U.S. PATENT DOCUMENTS

| | | | |
|---|---|---|---|
| 2,919,045 | 12/1959 | Waugh et al. | 220/4 F |
| 3,885,845 | 5/1975 | Krieks | 312/108 |

*Primary Examiner*—Mervin Stein
*Assistant Examiner*—Alex Grosz
*Attorney, Agent, or Firm*—Michael Ebert

[57] ABSTRACT

A module capable of being grouped into multiples to define various articles of furniture, such as bookcases and file cabinets. The module is constituted by top, bottom and side panels whose edges have longitudinal bores therein and are cut to form complementary tongues and grooves creating corner joints, whereby the panels may be compactly packaged and shipped in the flat state and thereafter assembled on a site to create a box-like module having rectangular front and rear openings. The joints are held together and the structure stabilized by a removable strut connector constituted by a pair of intersecting arms each acting as a bridge between a set of diagonally-opposed corners at the rear opening to form a truss, the arms being pivotally interconnected and being provided at their ends with laterally-extending pins that are insertable into the corner bores so that one may collapse the module simply by removing the strut connector.

8 Claims, 6 Drawing Figures

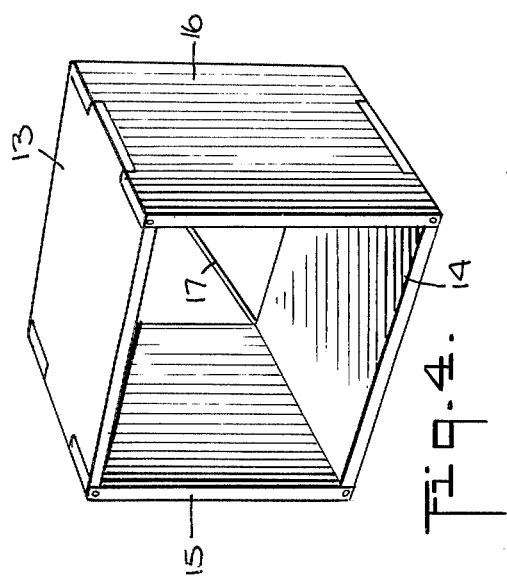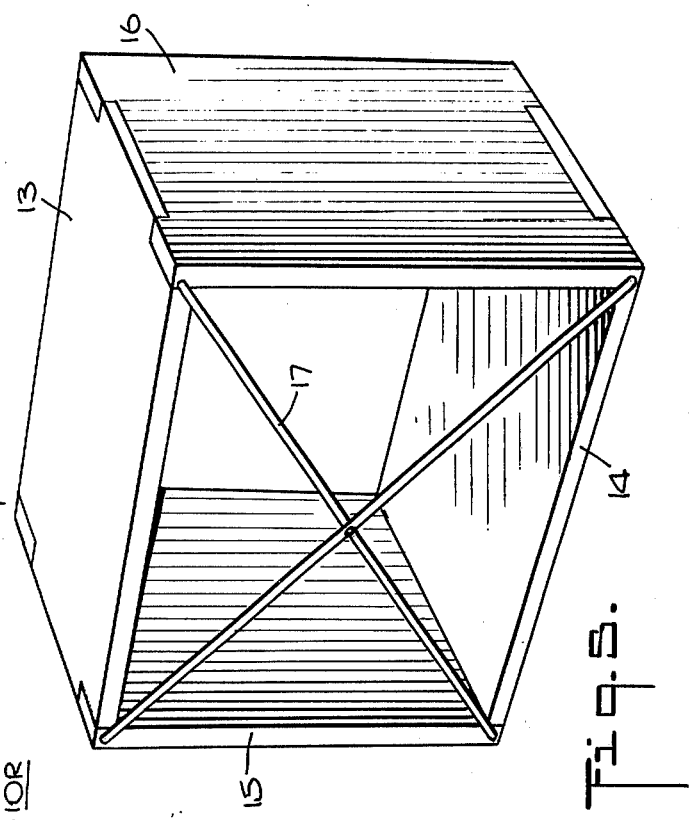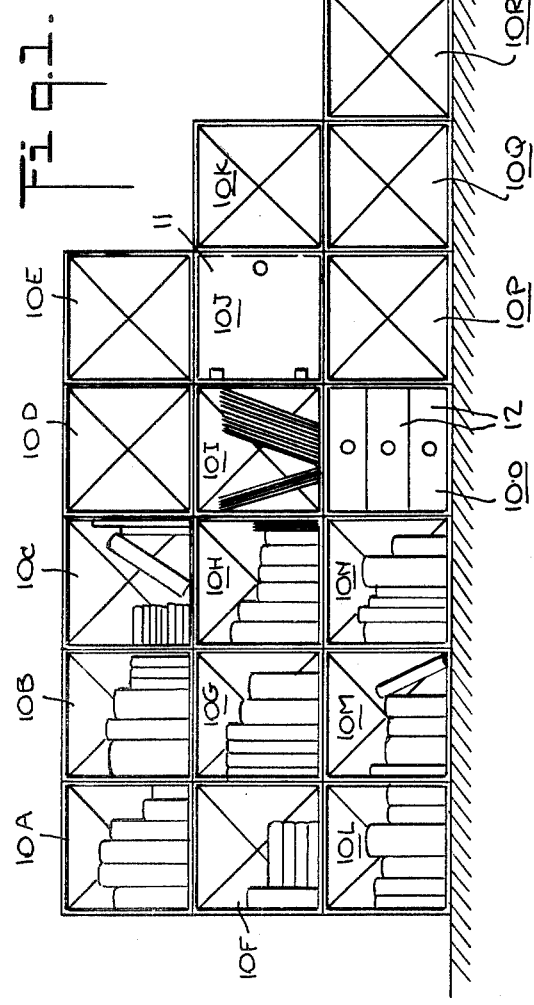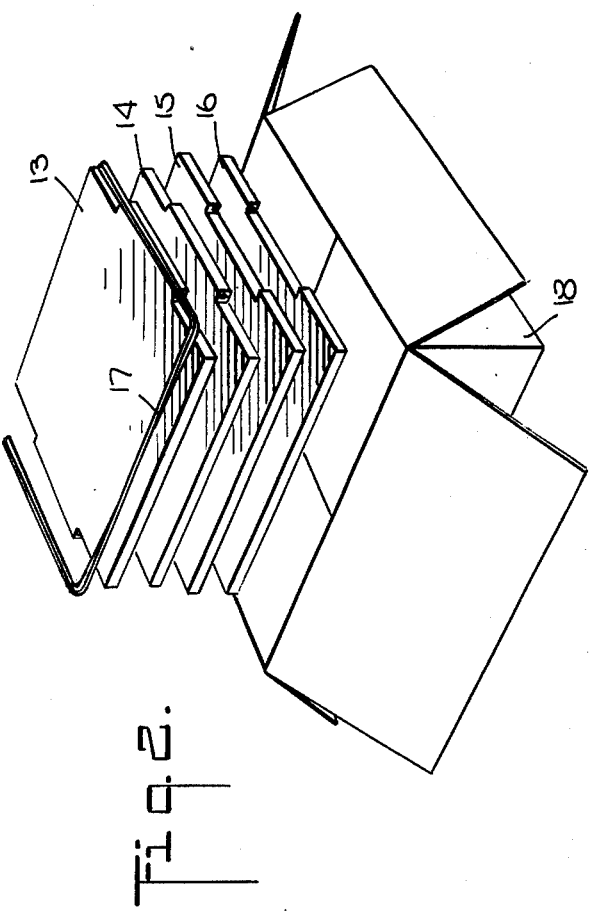

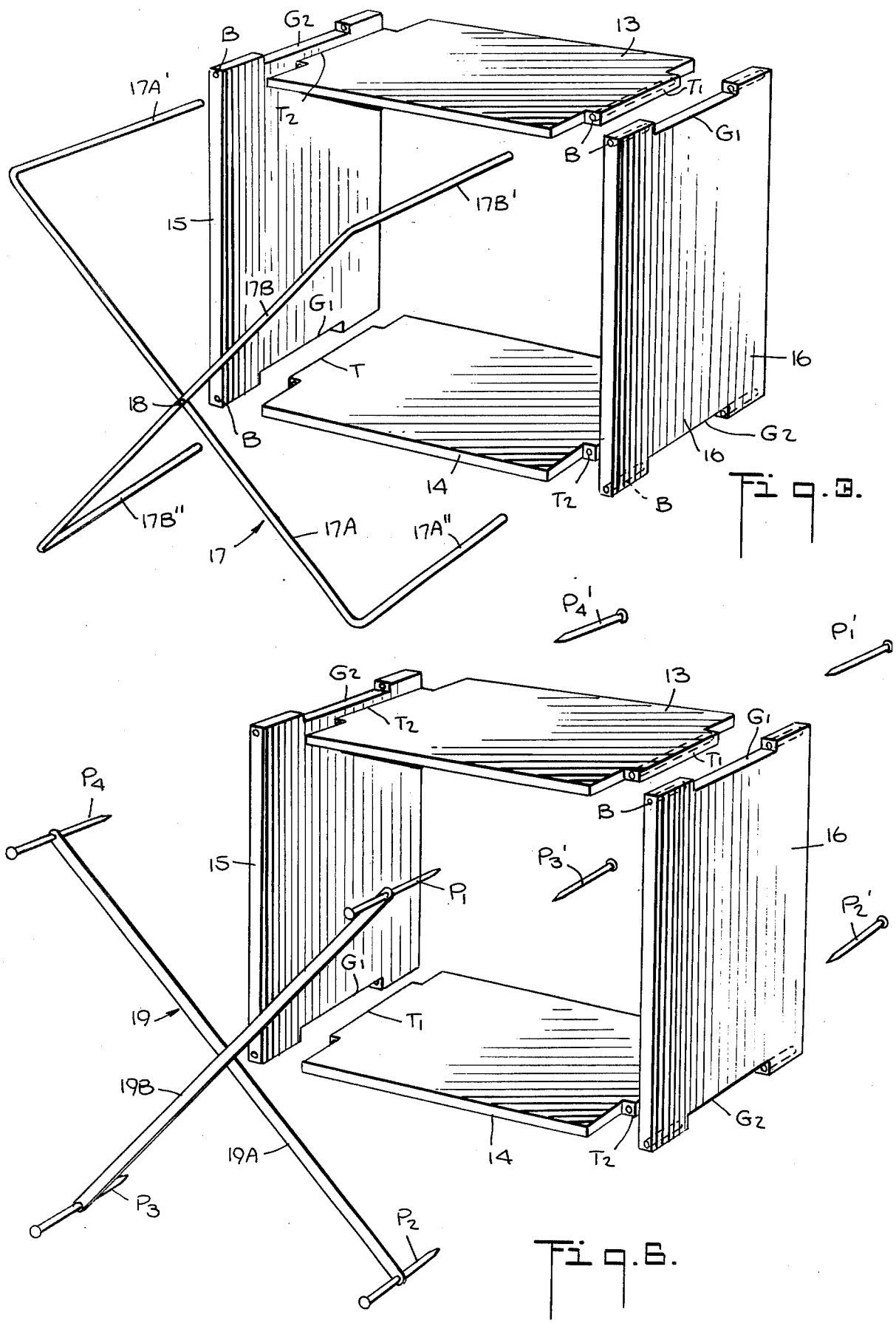

KNOCK-DOWN FURNITURE MODULE

BACKGROUND OF INVENTION

This invention relates generally to knock-down furniture, and more particularly to a module capable of being grouped into multiples to define various articles of furniture, the module being formed of four panels which may be joined together to create an open-ended box by means of a removable strut connector.

The geometry of a box is basic to most articles of furniture; for whether the article is a storage cabinet, a bookcase, a dresser or any piece having an interior space to accommodate and store books, clothing, utensils or other household, office or factory goods or supplies, the interior space or spaces have a box-like volume bounded by upper, lower and side walls.

An inherent characteristic of articles of furniture having box-like interior spaces is their high ratio of bulk-to-weight; for volume of each piece is mainly composed of open space. For example, a bookcase 8 feet long, 6 feet high and 1 foot wide, formed of wood, may weigh as little as one hundred pounds. Yet the structure is relatively bulky, and in order to ship a conventional bookcase of this size, a very large shipping carton is required. Since shipping charges are largely determined by the bulk of the article and to a much lesser extent by its weight, the shipping cost for an inexpensively-constructed bookcase may be disproportionally high. Thus it may cost $50 to ship a bookcase worth $100.

But the cost of shipping is not the only factor which must be taken into account, for there are also warehousing expenses. Typically, a factory which manufactures inexpensively-constructed bookcases must maintain an inventory thereof, and since each bookcase is bulky, the warehouse space requirements are considerable and therefore costly.

It is for these reasons that in recent years efforts have been directed toward creating knock-down furniture pieces whose components lend themselves to warehousing and shipping in the flat state to afford a low bulk-to-weight ratio, the components thereafter being assembled at the site.

The strength and stability of any article of furniture lies not only in the structural characteristics of the components forming the piece, but also on the connecting joints. Thus a table having a flat top and legs connected thereto, regardless of the quality of its components, will be a poor table if the joints are weak and unsteady.

It is the problem of joints which has plagued knock-down furniture, for one cannot with such furniture make use of epoxy or other strong permanent bonding agents at the joints, in that one must be able to dismantle the piece.

The present invention is directed to a knock-down module formed by four panels which are joined together by removable pins. A module generally of this type is disclosed in the Krieks U.S. Pat. No. 3,885,845, in which a knock-down furniture system is formed around a basic unit of two side panels and top and bottom panels which can be assembled in edge-to-edge relation. The edges are dove-tailed and are joined together by removable pins inserted in bores extending through the jointed corners, the pins acting to interconnect the edges of the panels which form the corners.

The strength and stability of this box-like unit is mainly determined by its pin-connected jointed corners. But these pins offer little resistance to forces or loads imposed on the structure in directions which are angled with respect to the wall surfaces. If, for example, a heavy diagonal pressure is applied to the Krieks unit, the joints will not be able to withstand this pressure and will be forced to assume an unacceptable trapezoidal form.

SUMMARY OF INVENTION

In view of the foregoing, the primary object of this invention is to provide a module of high strength and structural stability capable of being grouped into multiples to define various articles of knock-down furniture.

More particularly, it is an object of this invention to provide a module constituted by four panels which are joinable in edge-to-edge relation by a removable strut connector whereby the panels can be assembled into an open-ended box-like trussed form or collapsed for shipment in the flat state.

Also an object of the invention is to provide a strut connector which is collapsible to reduce its shipping bulk.

Yet another aspect of this invention is to provide a module that can be mass-produced at low cost.

Briefly stated, these objects are attained in a module in accordance with the invention constituted by top, bottom and side panels whose edges have longitudinal bores therein and are cut to form complementary tongues and grooves creating corner joints whereby the panels may be compactly packaged and shipped in the flat state and thereafter assembled on a site in edge-to-edge relation to create a box-like module having rectangular front and rear openings.

The joints are held together and the structure stabilized by a removable strut connector constituted by a pair of intersecting arms, each acting as a bridge between a set of diagonal corners at the rear opening to form a truss, the arms being pivotally interconnected and being provided at their ends with laterally-extending pins that are insertable into the corner bores so that one may collapse the module simply by removing the strut connector.

OUTLINE OF DRAWINGS

For a better understanding of the invention as well as other objects and further features thereof, reference is made to the following detailed description to be read in conjunction with the accompanying drawings, wherein:

FIG. 1 is an elevational view of a knock-down piece of furniture formed by a group of modules in accordance with the invention;

FIG. 2 is a perspective view of the panels and the strut connector from which the module is assembled, the component being in the flat state for packaging in a shipping carton;

FIG. 3 is an exploded view of the module;

FIG. 4 is a front perspective view of the assembled module;

FIG. 5 is a rear perspective view of the assembled module; and

FIG. 6 is a modified form of strut connector.

DESCRIPTION OF INVENTION

Referring now to FIG. 1, there is shown a storage cabinet formed by a group of modules 10A, 10B, 10C, etc., in accordance with the invention, the modules being stacked to form three stepped tiers. The modules are open-ended box-like structures, but each module may be further equipped with a swing door, such as door 11 in module 10-J, or a set of sliding drawers 12 as in module 10-O. Or the module side panels may be provided with ledges or brackets to support removable shelves. While the modules may be free standing, in practice the modules in a given multiple may be linked together by removable couplers which clamp the adjacent walls of the modules.

It is to be understood, therefore that the module is a basic unit providing a box-like interior space which may be subdivided in any desired manner or closed by doors or by other means. The modules lend themselves to grouping in multiples to create various knock-down furniture forms, FIG. 1 being merely one example in a broad range of possibilities.

Each module, as shown in FIG. 1, is made up of four rectangular panels 13, 14, 15 and 16 and a strut connector 17 which in its collapsed state has a U-shaped configuration, these components all fitting neatly in a carton 18, so that when the components are in their flat state, they may be compactly boxed for storage and shipment. The panels may be fabricated of wood, plastic or a suitable composite or laminated material having adequate structural strength.

As shown in FIGS. 3, 4 and 5, panels 13 and 14 function as the top and bottom walls of the module, while panels 15 and 16 form the side walls thereof, the edges on opposite ends of the panels each having bores B extending longitudinally therethrough. Top and bottom panels have their edges cut to define intermediate tongues $T_1$ and $T_2$, while side panels 15 and 16 have their edges cut to define complementary grooves $G_1$ and $G_2$ so that the panels may be assembled in edge-to-edge relationship with tongues $T_1$ and $T_2$ meshing with grooves $G_1$ and $G_2$ to produce jointed corners in which the bores in the tongued edges are in registration with the bores in the grooved edges. The resultant module has rectangular front and rear openings.

In order to hold the panels together and stabilize the module structure, strut connector 17 is composed of a pair of intersecting arms 17A and 17B formed by rod metal material. The arms are pivotally interconnected at their midpoint by a rivet 18, the ends of the arms having lateral extensions or pins $17_{A1}$, $17_{A2}$ and $17_{B1}$, $17_{B2}$, respectively.

Arm 17A bridges one set of diagonal corners at the rear opening of the module, while arm 17B bridges the other set of corners, the pins being inserted in the corner bores B. Thus as shown in FIG. 5, the strut connector not only provides pins to hold together the jointed corners but it also creates in combination with the panels a truss which reinforces the module and greatly augments its ability to withstand pressures or loads tending to create torque forces about the pin axes.

Because the intersecting arms of the strut connector 17 are pivoted together and are swingable, this connector may be collapsed in the manner shown in FIG. 2. It will be evident that the assembly procedure is extremely simple; for one has merely, as shown in FIG. 3, to bring the panels in edge-to-edge relation, with the tongues and grooves in mesh, and then insert the pins of the connector. To disassemble the module, one has but to withdraw the connector.

The module in FIG. 6 is composed of the same panels as that in the previous figures, but the strut connector 19 in this instance is constituted by interconnecting arms 19A and 19B which may be wooden slats whose ends have holes therein to receive headed pins $P_1$, $P_2$, $P_3$ and $P_4$. These pins are short and penetrate the rear half of the bores extending through the corners, the other half of these bores being penetrated by a second set of headed pins $P'_1$, $P'_2$, $P'_3$, $P'_4$. The advantage of this connector is that when it is collapsed it has no lateral extensions. The pins for the joints may be held in a separate packet in the shipping carton. Also, this connector makes use of flat strips rather than round rods which in some installations may be aesthetically desirable.

While there have been shown and described preferred embodiments of a Knock-Down Furniture Module in accordance with the invention, it will be appreciated that many changes and modifications may be made therein, without however departing from the essential spirit thereof.

Thus the pins shown in FIG. 6 may be threaded to be received in threaded bores, thereby locking the strut connector to the panels.

I claim:

1. A knock-down module for creating articles of furniture, the module comprising:
    A. four panels which define the upper, lower and side walls of the module, the edges at opposite ends of each panel having longitudinal bores therein, the edges of the top and bottom panels being cut to define intermediate tongues and the edges of the side panels being cut to define complementary grooves, whereby the panels may be assembled in edge-to-edge relation to create an open box-like structure having rectangular front and rear openings; and
    B. a strut connector which combines with the panels to create a trussed structure, said connector being formed of a pair of intersecting arms, each arm bridging a set of diagonal corners in the rear opening and having pins extending laterally therefrom which are insertable in said bores to hold the jointed corners together.

2. A module as set forth in claim 1 wherein said arms are interpivoted by a rivet going through the intersection of the arms.

3. A module as set forth in claim 1, wherein said pins are integral with said arms.

4. A module as set forth in claim 3, wherein said arms are formed by metal rods having right angle ends to form said pins.

5. A module as set forth in claim 1, wherein said panels are formed of wood and said connector of metal.

6. A module as set forth in claim 1, wherein said connector arms are formed by slats having end holes through which headed pins are inserted.

7. A module as set forth in claim 1, further including a hinged door to close the front opening.

8. A module as set forth in claim 1, further including drawers sliding into said module through said front opening.

* * * * *